United States Patent Office 3,520,423
                    Patented July 14, 1970

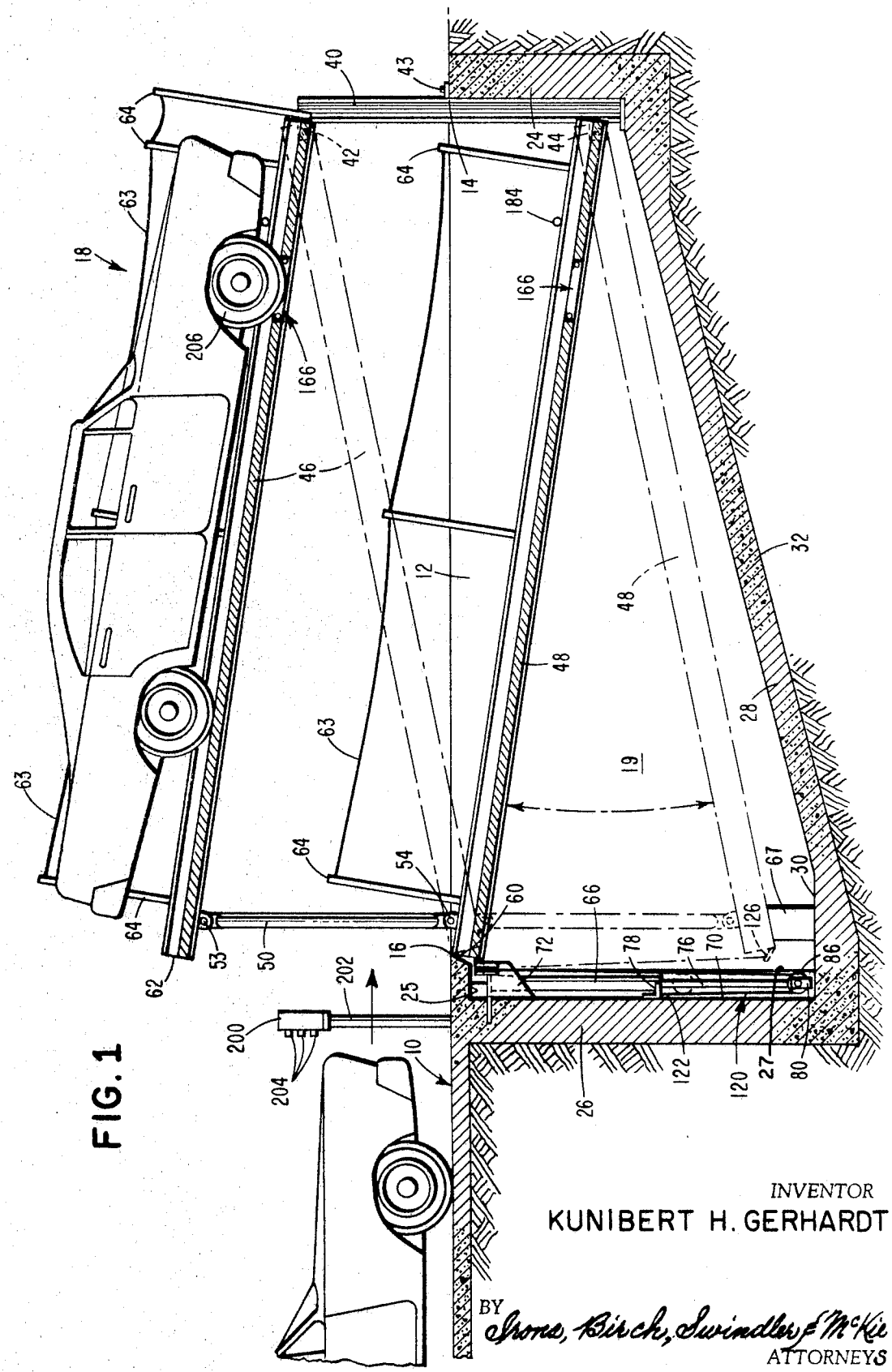

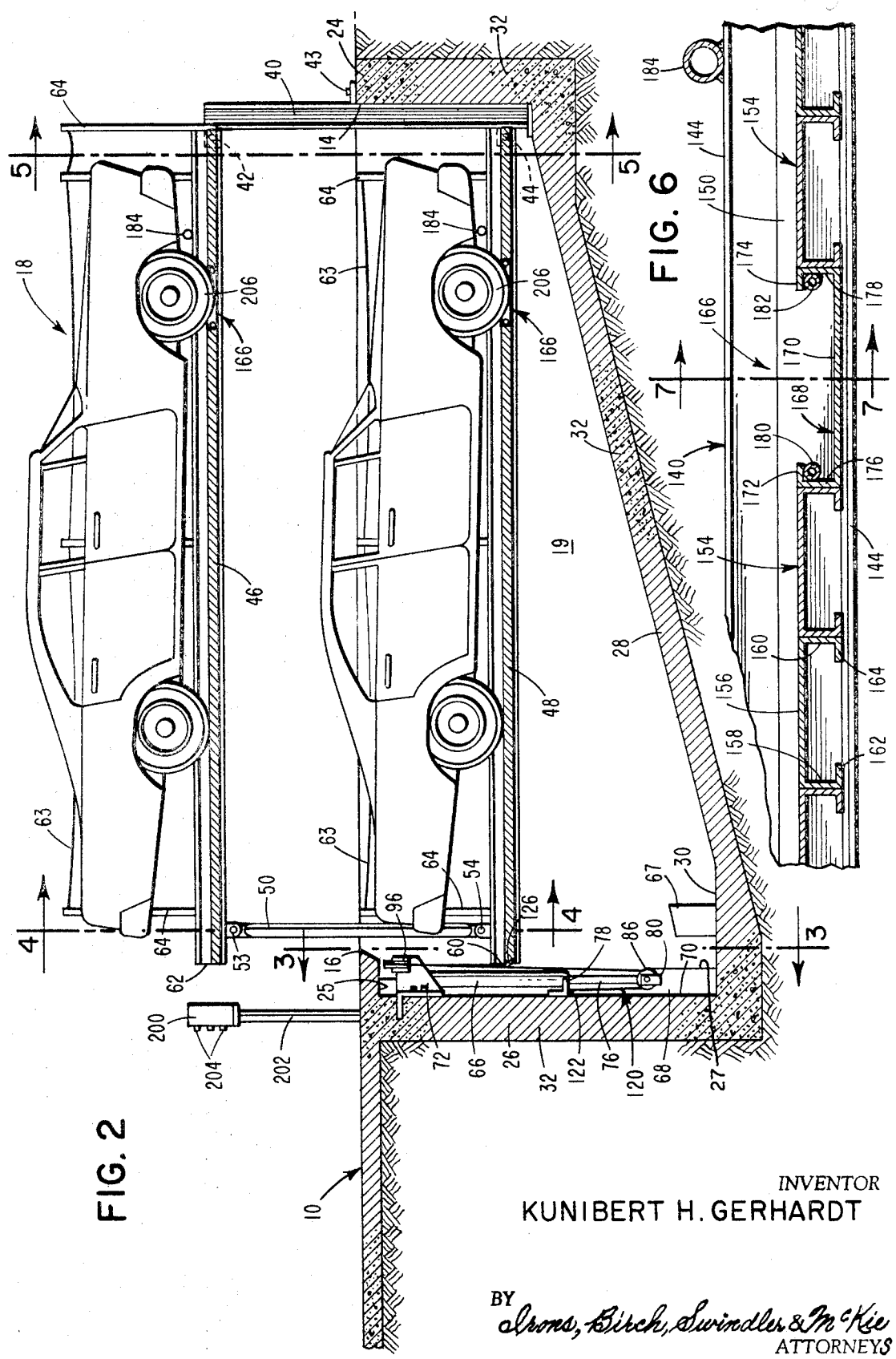

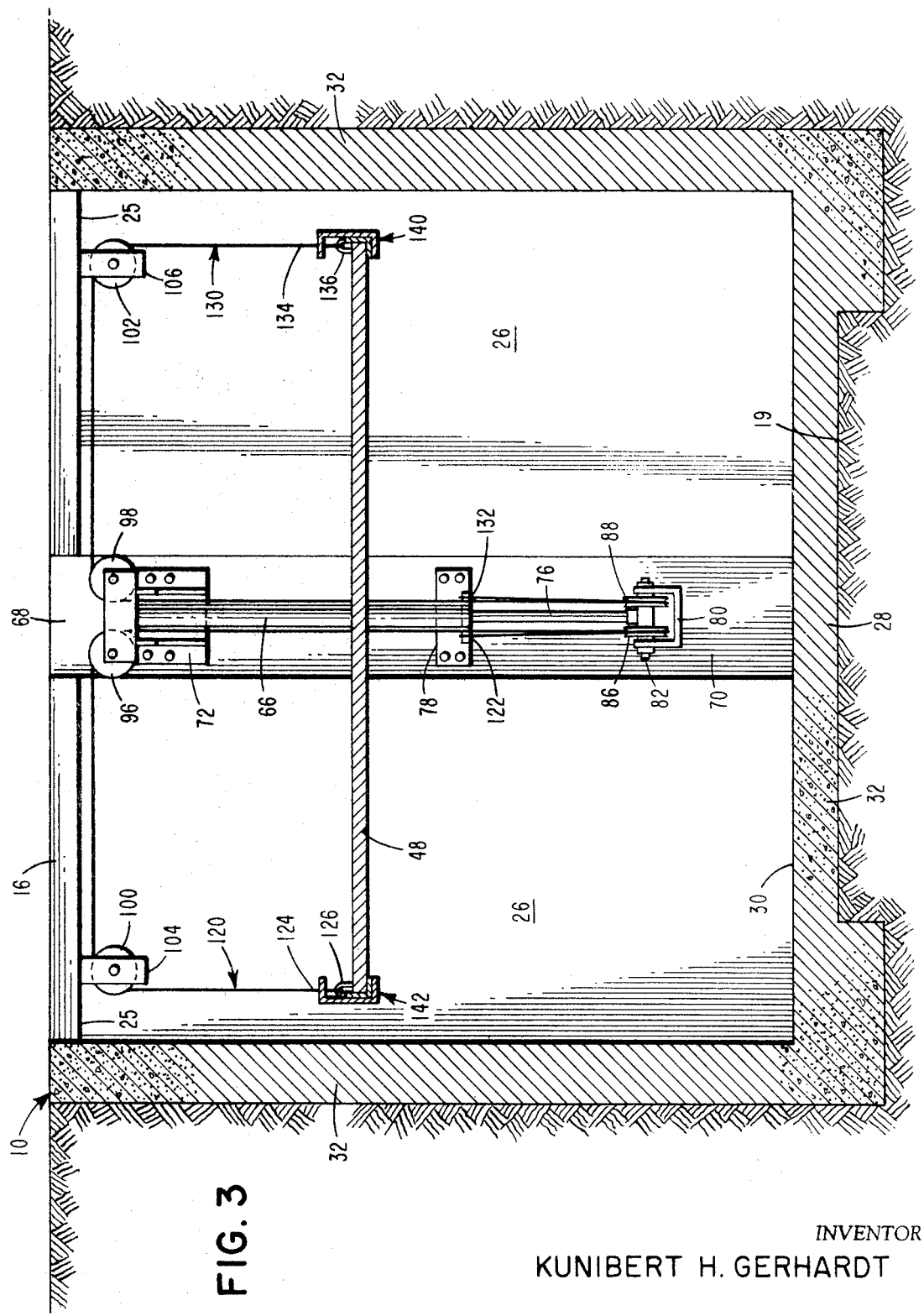

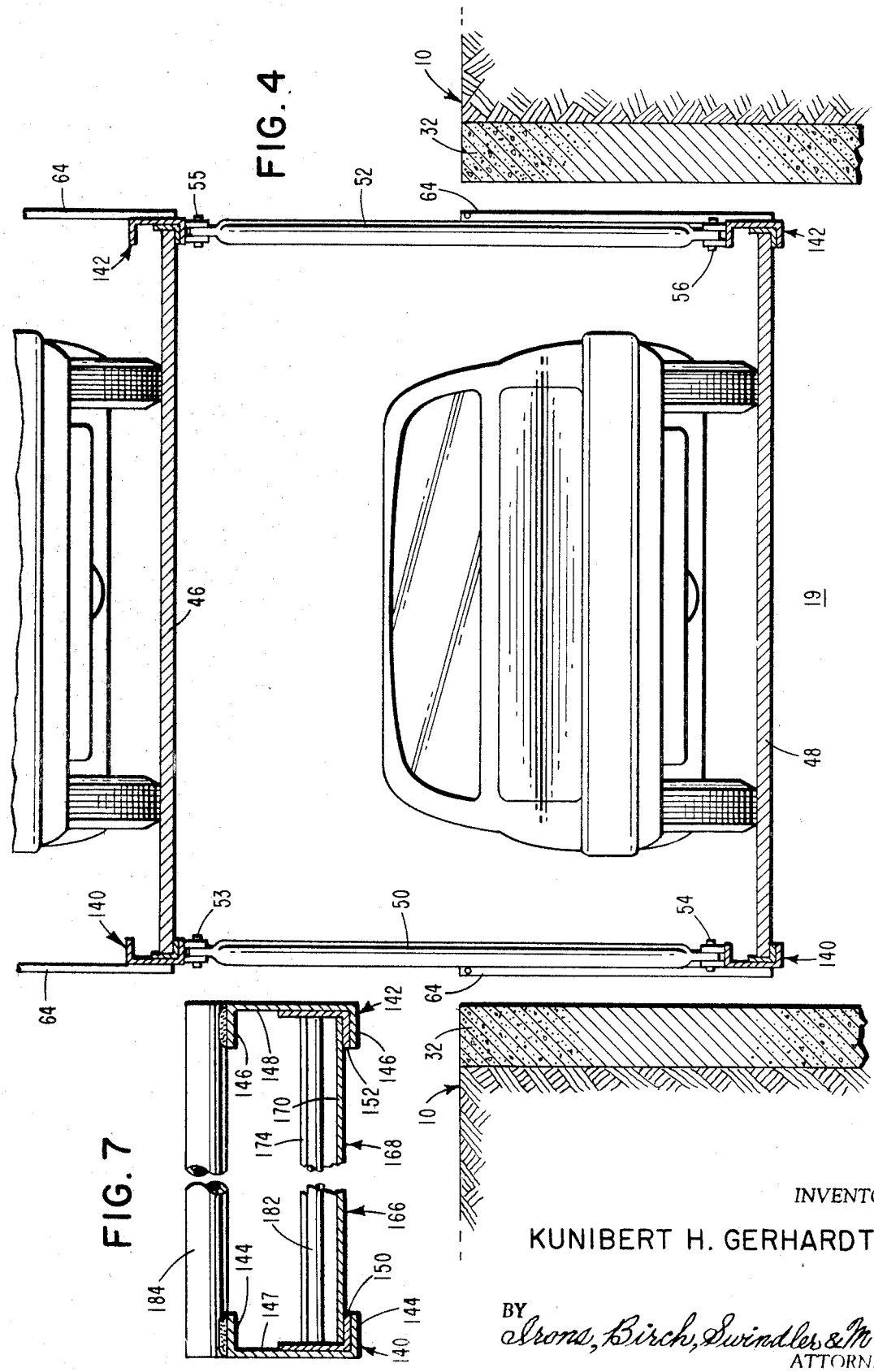

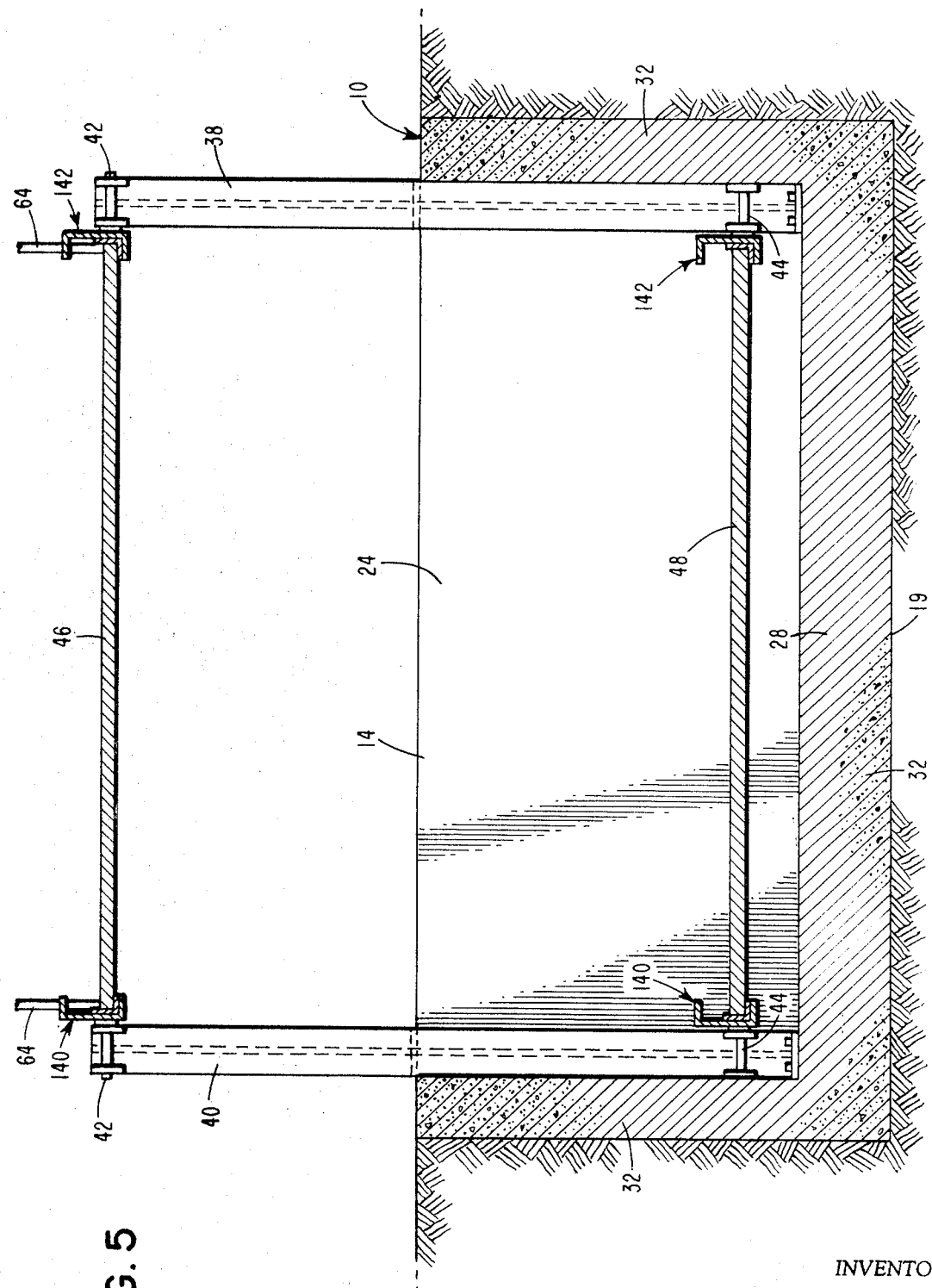

3,520,423
VEHICLE STORAGE APPARATUS
Kunibert H. Gerhardt, 1735 Coronado Ave., Apt. 31,
Long Beach, Calif. 90804
Filed Feb. 7, 1968, Ser. No. 703,746
Int. Cl. E04h 6/06
U.S. Cl. 214—16.1                                    9 Claims

ABSTRACT OF THE DISCLOSURE

An apparatus for storing two or more vehicles which includes an opening with a sloped bottom recessed beneath the normal vehicle supporting surface. A framework including two vehicle storage platforms interconnected to move in parallelism is selectively raised and lowered within the opening by an actuator so that the vehicles can be stored on or removed from the respective platforms independently.

BACKGROUND OF THE INVENTION

This invention relates to improvements in storage apparatus and more particularly to a storage facility for vehicles.

Multi-deck vehicle storage units are used where high density storage is required. Such locations are usually in the centers of cities or commercial districts such as shopping centers and the like where space is at a premium. Such apparatus is costly to maintain since the presence of full time attendants is required to handle the vehicles and to protect them from theft.

The vehicle storage facility of the instant invention can serve as a private garage but its preferred use is in ground level parking lots and multi-level parking garages. When used in the preferred manner, a plurality of storage facilities constructed in accordance with the invention are assembled in side-by-side relation to provide two selectively attainable parking spaces at each facility. The storage facilities can be assembled for a variety of angles of parking except for parking parallel to a building wall.

The invention features a fixed approach ramp or reference surface for each storage facility such as the surface of a parking lot or one of the floors in a multi-level parking garage. When used in a street level parking lot, a trapezoidal excavation in the ground receives a vehicle stored on the lower platform while the vehicle stored on the upper platform is disposed above ground. Since the storage facilities are prefabricated by the manufacturer, there is a minimum of on site construction. Therefore, the cost of preparing such a storage facility is low since the prefabricated facility need only be installed in a prepared excavation and it is ready for use. The parking lots constructed in accordance with the invention can have twice the capability of present parking lots in only the relatively short time that is required to prepare the excavation and install the device.

When used in a multi-level parking garage, the storage facility is placed so that the platforms form storage zones above and below the garage floor. With the storage facility, a multi-level parking garage can park as many vehicles as a parking garage without the facility that has twice as many floors because each of the platforms on each storage facility functions as a parking space. This features results in simplified construction to the extent that less floors are needed to park an identical number of cars and the number of ramps that take up a large amount of space is reduced.

SUMMARY OF THE INVENTION

A storage facility for vehicles including means forming a reference surface with first and second spaced boundaries defining an opening therebetween; a support frame connected to reference means at one of said boundaries; said support frame extending above said reference surface; vehicle support means including a plurality of substantially parallel platforms each of which is pivotally connected to said support frame in spaced relation; means for selectively positioning each of said platforms to have one end in substantial alignment with one of said boundaries; the pivotal connection of one of said platforms being below said reference surface; and the pivotal connection of another of said platforms being above said surface.

BRIEF DESCRIPTION OF THE DRAWINGS

FIG. 1 is a sectional side elevational view of the vehicle storage facility positioned to receive a vehicle on the lowermost platform in accordance with the invention;

FIG. 2 is a sectional side elevational view of the vehicle storage facility with the platforms positioned horizontally to prevent removal of the stored vehicles;

FIG. 3 is a sectional view taken along line 3—3 in FIG. 2 showing a hydraulic system for raising and lowering the platforms;

FIG. 4 is a sectional view taken along line 4—4 of FIG. 2;

FIG. 5 is a sectional view taken along line 5—5 of FIG. 2;

FIG. 6 is a partial longitudinal sectional view of the vehicle supporting platform of FIG. 2; and FIG. 7 is a sectional view of the platform taken along line 7—7 of FIG. 6.

DESCRIPTION OF A PREFERRED EMBODIMENT

The invention can best be described by reference to FIG. 1 wherein the paved surface of a street level parking lot or a deck of a multi-level parking garage defines a reference surface 10 with an opening 12 therein. The opening is defined by a first boundary 14 and second boundary 16 in spaced longitudinal relation at opposite ends of the openings.

A vehicle storage facility 18 including an upper stall and a lower stall is mounted within the opening 12 in a manner to be explained. It is preferred that the opening 12 be continuous and with only the first and second boundaries and no side boundaries so that a plurality of storage facilities can be arranged in close side-by-side relation. However, the opening can have side boundaries if only one facility is employed or if it is desired to provide walking space between adjacent facilities.

If a storage facility is installed on a ground level parking lot, the opening 12 defines a recess in the form of an excavation 19 including a first wall 24 depending from first boundary 14. A ledge if formed immediately below boundary 16 by undercutting surface 10 so that a downwardly facing lip 25 is formed. A second wall 26 having an inner surface 27, substantially longer than the wall 24, depends from lip 25.

The excavation has a sloping floor 28 connecting wall 24 and wall 26 so that in elevation the excavation is trapezoidal in configuration. If desired, a portion of sloping floor 28 adjacent wall 26 can be substantially horizontal to form a platform 30. If desired, the entire excavation can be reinforced by suitable reinforcing means 32 which might be concrete, cinderblock, bricking or the like. It should be understood that the trapezoidal recess is preferred but an excavation of rectangular or of any other configuration could be used as long as the storage facility can move freely therein.

If the facility is installed on one of the decks of a multi-level parking garage, the opening in the deck is defined by boundaries 14 and 16 with the aforementioned reference surface 10 being the floor of the garage. In this environment, there are not any walls depending from the boundaries nor a bottom.

A support frame comprising two spaced upright main columns 38 and 40 extending above and below the reference surface 10 are fastened to opening 12 along boundary 14 by suitable fastening means such as bolts 42 or the like embedded in surface 10. Each of columns 38 and 40 is provided with one horizontally disposed hinge pin 42 above reference surface 10 and a second hinge pin 44 horizontally disposed below the reference surface.

An upper platform 46 is pivotally connected to hinge pins 42 and a lower platform 48 is pivotally connected to hinge pins 44 between the two spaced upright main columns 38 and 40. Each platform is a generally planar rectangular panel adapted to support a vehicle stored in the facility. The platforms 46 and 48 are held in parallel relation by restraining columns 50 and 52, which are connected between the platforms on their lateral edges at their ends remote from hinge pins 42 and 44. Column 50 is pivotally connected to upper platform 46 by pin 53 and to lower platform 48 by pin 54. Column 52 is pivotally connected to upper platform 46 by pin 55, and to lower platform 48 by pin 56. The partial parallelogram formed by the platforms and columns allows the free ends of the upper and lower platforms to be selectively aligned with reference surface 10 as shown in the solid and phantom lines in FIG. 1.

When the free end 60 of lower platform 48 is in alignment with reference surface 10, the upper platform 46 is in an elevated position as illustrated in FIG. 1. When the free end 62 of upper platform 46 is in alignment with reference surface 10, the lower platform 48 is within the excavation 19 as illustrated in phantom in FIG. 1 where it rests on member 66 which is carried by the horizontal platform 30 of floor 28.

Each platform has a guard railing 63 consisting of a flexible chain or line that is supported by stanchions 64 for the protection of people on the platform.

The platform are raised and lowered by a hydraulic cylinder 66 which is disposed under lip 25 in a recess 68 formed in inner surface 27 wall 26 so that it will not extend into the opening 12 to interfere with the movement of the platforms. The hydraulic cylinder 66 is fastened to the rear wall 70 of the recess by a bracket 72 so that its piston 76 will be urged downwardly as the cylinder 66 is expanded. The opposite end of the hydraulic cylinder is also fastened to rear wall 70 by a second bracket 78.

A housing 80 at the free end of piston rod 76 includes a horizontal axle 82 which rotatably carries two spaced pulleys 86 and 88. Bracket 72 rotatably carries pulleys 96 and 98 so that their axes of rotation are at right angles to the axis of rotation of pulleys 86 and 88. Side pulleys 100 and 102 are rotatably carried in brackets 104 and 106 on lip 25 so that their axes of rotation are parallel to pulleys 96 and 98.

A cable 120 has one end 122 fastened to bracket 78 and its other end 124 fastened to anchor 126 on platform 48. The intermediate portion of cable 120 runs upward from anchor 126 a quarter turn around pulley 100 and then a quarter of a turn around pulley 96 after which it is wrapped half way around pulley 86 and fastened to bracket 78. A cable 130 has one end 132 fastened to bracket 78 adjacent end 122 of cable 120 and its other end 134 fastened to anchor 136 on lower platform 48. Cable 130 passes around pulleys 102, 98 and 88, in a manner similar to the reeving of cable 120.

Since the upper and lower platforms 46 and 48 are identical, a description of the structure comprising platform 48 can serve as a description of both platforms. As shown in FIGS. 6 and 7, platform 48 includes two spaced channel members 140 and 142. Flanges 144 on channel member 140 are turned inwardly to face the flanges 146 on channel member 142 and angle members 150 and 152 are carried by the lower inwardly facing flanges. Channel webs 147 and 148 are pivotally connected to hinge pins 44 on main columns 38 and 40.

A plurality of "C" sections 154 supported on the reinforced lower flanges of the channel sections in side-by-side relation comprise a web 156 joining flanges 158 and 160. Return lips 162 and 164 which are parallel to the web 156 are spaced therefrom by the flanges 158 and 160. The "C" sections are arranged on the channels with their return lips in engagement with angle members 150 and 152 so that the adjacent webs present a continuous upper surface for supporting a vehicle.

A wheel well 166 on the platform holds one pair of the wheels of the vehicle and gives a signal to the operator that the car is completely on the ramp and does not overhang the end thereof. The wheel well is a depression formed by an inverted "C" section 168, whose web 170 is wider than the webs 156 of the aforementioned sections to accommodate the wheel of a vehicle between the return lips 172 and 174. The flanges 176 and 178 are the same height as the flanges on the other sections so that return lips 172 and 174 are coplanar with webs 156. Reinforcing means in the form of bars 180 and 182 at the juncture of the return lips 172 and 174 and flanges 176 and 178 provide a relatively smooth edge to prevent damage to the wheel rolling into or out of the wheel well.

While the wheel well could be located at the free end of the platform, in a preferred form, it is near the hinge pin so that it will be out of the path of the vehicle occupants.

A safety bar 184 connected across the upper flanges 144 and 146 of channel members 140 and 142 intermediate wheel well 166 and the hinge point provides an auxiliary stopping device that prevent the vehicle wheel from overshooting the wheel well.

The vehicle storage facility is operated from a suitable control station 200 on a standard 202 disposed to one side of the platforms. The control station can include a plurality of key-operated switches 204 so that only authorized persons can actuate the platforms.

To operate the storage facility, the operator of the first vehicle selects a platform on which he will park. If the vehicle is to be stored on lower platform 48, the operator uses his key to actuate the control station 200 so that platform 48 is moved into alignment with the reference surface 10. The vehicle is then driven onto the platform 48 until its front wheels 206 drop into the wheel well 166. The wheel well is preferred over any other form of stop because it provides a positive stop to the vehicle and at the same time, there is no chance that the operator of the vehicle will fail to recognize it since he will feel the wheel drop as it passes return lip 172. With other stops such as raised obstacles on either side of the wheel rest zone, it is possible that the operator when encountered the first of these stops will think it is the second and consequently the car wheels will not be caught in the wheel rest, resulting in the danger of the car rolling when the angle of the platform is changed and that the car will overhang the platform.

The operator of the second vehicle desiring to use the facility actuates appropriate switches at the control station 200 to align the upper platform 46 with the reference surface 10. This causes the lower platform 48 to descend through opening 12 to the position shown in the phantom lines in FIG. 1. Then the second vehicle can be driven upwardly onto platform 46 until it enters a wheel well 166 in a manner similar to that just explained for the first car. It is to be noted that the platforms can be disposed horizontally in parallel relation to the reference surface 10 as shown in FIG. 2. This arrangement prevents theft of the vehicles since the vehicle on the lower platform is disposed below the reference surface, while the vehicle on the upper platform is well above the reference surface. Since a key is necessary to actuate the switches 204 at control station 200 to align the upper or lower platforms with the reference surface 10, the cars cannot be removed from the platform by an unauthorized person. Of course, the key switches 204 may be replaced by manually depressible buttons if the key security is not needed, particularly in a parking garage or lot which is under the control and surveillance of parking attendants.

It should be noted that the vehicle storage facility provides parking for two vehicles on spaced platforms so that either vehicle can be parked or removed from the parking space independently of the other vehicle. In addition, it should be noted that this facility can be employed on a street level system where an opening 12 is prepared and the lower platform is under ground or it can be used in a multi-level parking garage where the reference surface 10 is a floor of the garage and the opening 12 is merely a hole in the floor which floor supports the support frame including spaced upright main columns 38 and 40 and the hydraulic cylinder 66. It should be noted that in this latter construction sufficient space would have to be provided between the floors so that a car parked on the upper platform of one floor does not come into contact with the lower platform on the adjacent upper floor.

In addition, it should be noted that another feature of this device is that it can be employed to move cards from one level an anintermediate half level. For example, if another platform were provided that was substantially in alignment with hinge 44, vehicles on the reference surface 10 or on another reference surface in alignment with the lower platform 48 as shown in phantom could be driven up or down half a level so that they would all finally be on a level coplanar with hinge 44.

While the invention has been described with particular reference to a ground level parking garage, it is to be understood that this device could be employed in any multi-level storage facility and that the particular apparatus disclosed herein is capable of many forms, all obvious to persons of ordinary skill in this art in light of the disclosure of this invention. Accordingly the scope of the invention should not be limited to the specific embodiment disclosed herein, but only by the scope of the appended claims.

I claim:

1. An apparatus for storage of vehicles comprising:
   means defining an approach surface having a terminal edge,
   a support frame spaced from the terminal edge of said approach surface,
   a plurality of longitudinally extending vehicle supporting platforms disposed in a stacked relation each of said platforms having a forward end at said support frame and a rearward end movable into alignment with the terminal edge of the approach surface, at least the lowermost platform of said stack being movable to a position below the plane of said approach surface,
   means pivotally connecting the forward ends of said platforms to said supporting frame at vertically spaced positions respectively on said supporting frame providing sufficient space therebetween for the storage of a desired vehicle,
   a pair of support columns in transversely spaced positions at the rearward end of said platforms connecting adjacent platforms, said columns being pivotally connected to each of said platforms for swinging movement through a plane longitudinal of said platform,
   actuator means comprised of first and second pairs of pulleys, first bracket means for mounting said first pair of pulleys in spaced relation at said approach surface defining means, cable means connected at spaced positions on the rearward end of the lowermost end of the lowermost platform and having portions extending from each of said spaced connections on said platform over said first pair of pulleys respectively, second bracket means for mounting said second pair of pulleys interiorly of the spaced first pair of pulleys for aligning the respective portions of said cable means after passage of said cable portions over said first pair of pulleys, said cable portions being respectively received about said second pair of pulleys and power means operatively connected to the aligned portions of said cable means for driving said cable means to selectively raise and lower said platforms to selectively align said platforms with the terminal edge of said approach surface.

2. An apparatus as recited in claim 1 wherein said power means includes an extensible member selectively movable between two positions and wherein said aligned cable portions are fixedly mounted at a predetermined point, said extensible member being engageable with said aligned cable portions between said predetermined point and said second pair of pulleys for selectively diverting the path of said cable portions to raise the platforms.

3. An apparatus for the storage of vehicles as recited in claim 2 wherein said extensible means is selectively movable vertically and further including a third pair of pulleys mounted on said extensible means said respective cable portions extending downwardly from said second pair of pulleys and being received about said pulley and extending upwardly therefrom and bracket means for securing said cable portions at fixed positions above said third pair of pulleys.

4. An apparatus for the storage of vehicles as recited in claim 1 wherein said power means is comprised of a hydraulic cylinder including a selectively movable piston rod, said cylinder being operatively mounted beneath said second pair of pulley means with said rod being movable in a generally vertical direction and means for connecting said piston to each of said cable portions for driving said cable means to raise and lower said platform.

5. An apparatus for the storage of vehicles as recited in claim 4 further including a third pair of pulleys operatively mounted to said piston rod and receiving said cable portions respectively thereabout after passage of said cables over said second pair of pulleys respectively and bracket means for mounting said cable portions at fixed positions above said third pair of pulleys.

6. An apparatus for the storage of vehicles as recited in claim 1 wherein at least one of said platforms is comprised of a pair of spaced channel members in mutually facing relation, such channels being pivotally connected to said support frame, said platform further including a plurality of transverse members having a C-shaped section including return lips, flanges and webs, said C-shaped transverse members having their opposed ends supported by said channels and having their web portions forming a substantially continuous vehicle supporting surface.

7. An apparatus for the storage of vehicles as recited in cliam 6 wherein at least one of said C-shaped transverse members is inverted to form a depression adapted to receive the wheels of a vehicle.

8. A facility for vehicle storage as defined in claim 1 wherein said one platform includes a plurality of spaced channel members in mutually facing relation, said channels being pivotally connected to said support frame;
   a plurality of transverse members supported in side by side relation by said spaced channel members; and
   at least one of said transverse members being positioned to form said depression.

9. A facility for vehicle storage relative to a reference surface comprising:
   a recess depending from the reference surface including a bottom surface, first and second boundaries defining an opening therebetween, first wall means depending from said first boundary to join said bottom surface and second wall means depending from said second boundary to also join with said bottom surface, said first boundary being provided with a lip coplanar with the reference surface;

a support frame secured along said first wall means to extend above the reference surface;

vehicle support means including a plurality of interconnected platforms pivotally connected to said support frame at vertically spaced points respectively, the pivotal connection of one of said platforms being below the reference surface, and the pivotal connection of another of said platforms being above the reference surface;

at least one of said platforms including a plurality of spaced channel members in mutually facing relation, said channels being pivotally connected to said support frame and a plurality of transverse members supported in side by side relation by said spaced channel members, said transverse members including a plurality of C-shaped sections, each of said sections including return lips, flanges and webs, at least one of said C-shaped sections being inverted to form a depression adapted to receive the wheels of a vehicle;

actuator means disposed within said recess and beneath said lip for selectively positioning the free end of each of said platforms in substantial alignment with said lip wherein said actuator means includes actuatable means having an extensible portion depending from said reference surface, cable means having one end fixedly connected and its other end connected to said vehicle support means; and means on said extensible portion engaged with said cable means intermediate the ends thereof so that movement of said cable by said extensible portion causes said selective positioning of said platforms.

References Cited

UNITED STATES PATENTS

| | | |
|---|---|---|
| 1,249,719 | 12/1917 | Cherry. |
| 2,573,587 | 10/1951 | McGraw. |
| 2,717,088 | 9/1955 | Morley. |
| 3,131,820 | 5/1964 | Creedon. |

FOREIGN PATENTS

| | | |
|---|---|---|
| 225,112 | 12/1962 | Austria. |
| 903,307 | 8/1962 | Great Britain. |
| 1,224,411 | 7/1956 | France. |
| 900,008 | 12/1953 | Germany. |
| 300,263 | 9/1965 | Netherlands. |
| 271,311 | 1/1951 | Switzerland. |

GERALD M. FORLENZA, Primary Examiner

R. B. JOHNSON, Assistant Examiner